United States Patent
Plush

(10) Patent No.: US 8,764,893 B2
(45) Date of Patent: Jul. 1, 2014

(54) DUST SCRUBBER

(71) Applicant: Montall Holdings Pty Ltd, Somersby (AU)

(72) Inventor: Brian Plush, Ourimbah (AU)

(73) Assignee: Montall Holdings Pty Ltd, Somersby (AU)

( * ) Notice: Subject to any disclaimer, the term of this patent is extended or adjusted under 35 U.S.C. 154(b) by 0 days.

(21) Appl. No.: 14/024,972

(22) Filed: Sep. 12, 2013

(65) Prior Publication Data

US 2014/0008962 A1    Jan. 9, 2014

Related U.S. Application Data

(62) Division of application No. 13/254,481, filed as application No. PCT/AU2010/000244 on Mar. 3, 2010, now Pat. No. 8,551,233.

(30) Foreign Application Priority Data

Mar. 3, 2009  (AU) ................ 2009900913
Nov. 16, 2009  (AU) ................ 2009905581

(51) Int. Cl.
*B01D 47/00* (2006.01)
*E21C 25/00* (2006.01)
*E21C 27/02* (2006.01)

(52) U.S. Cl.
USPC .............. 96/322; 299/12; 299/43; 299/64

(58) Field of Classification Search
USPC ............ 95/57–81; 299/34.01, 34.09, 34.1; 96/322
See application file for complete search history.

(56) References Cited

U.S. PATENT DOCUMENTS

| | | | |
|---|---|---|---|
| 4,225,188 A | 9/1980 | McGuire et al. | |
| 4,315,658 A | 2/1982 | French et al. | |
| 4,351,567 A * | 9/1982 | Gillingham | 299/45 |
| 4,358,160 A | 11/1982 | Kissell | |
| 4,380,353 A | 4/1983 | Campbell | |
| 5,518,299 A * | 5/1996 | Adamczyk et al. | 299/12 |

* cited by examiner

*Primary Examiner* — Duane Smith
*Assistant Examiner* — Joubert X Glover
(74) *Attorney, Agent, or Firm* — Gordon & Jacobson, PC

(57) ABSTRACT

A dust scrubber for a mining shearer machine is adapted to be mounted behind the rear surface of the shearer arm, on the opposite side of the arm to the mine surface being cut, so as to extract airborne particulates. The scrubber may be mounted to the shearer via a compensation mechanism such as a double hinge and link arrangement which maintains relatively static position and/or orientation of the scrubber despite the pivoting of the shearer arm in operation.

12 Claims, 10 Drawing Sheets

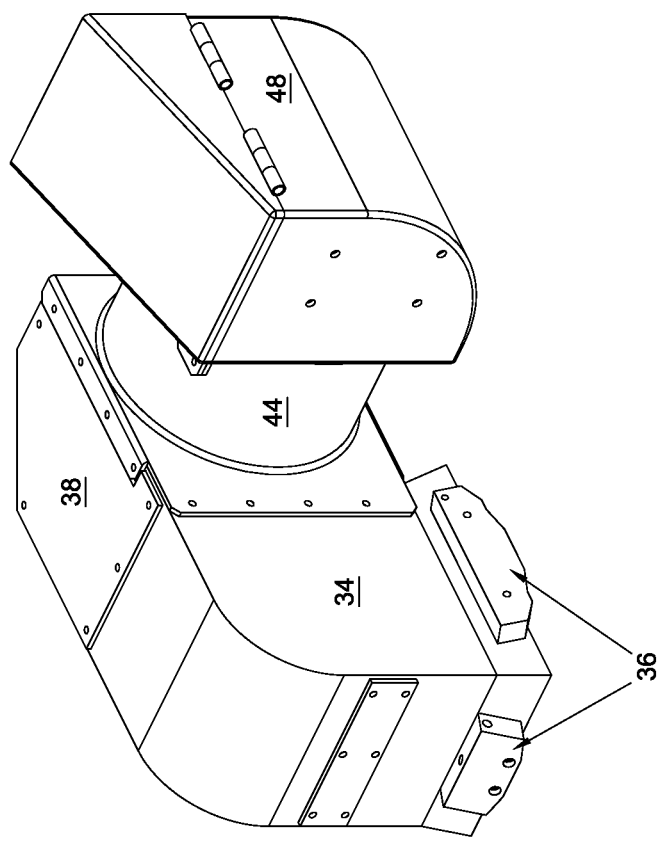

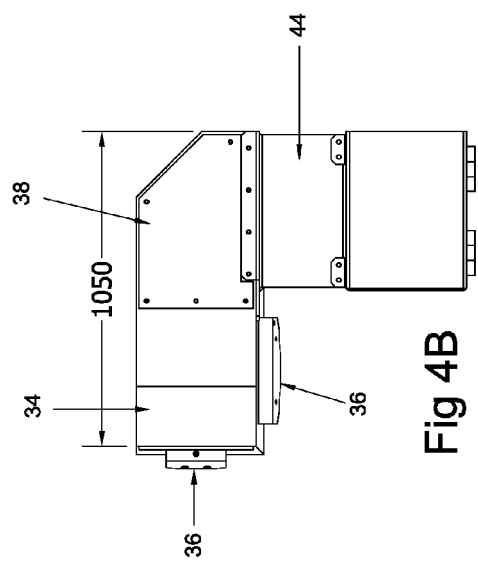
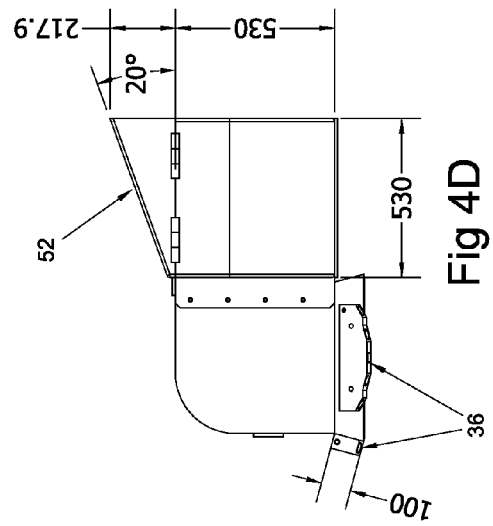
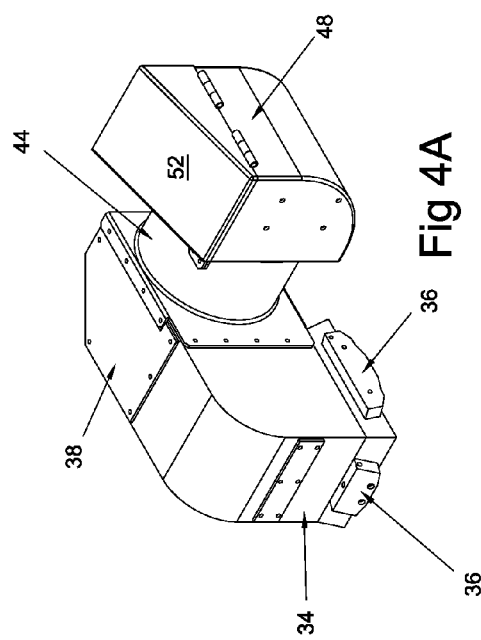
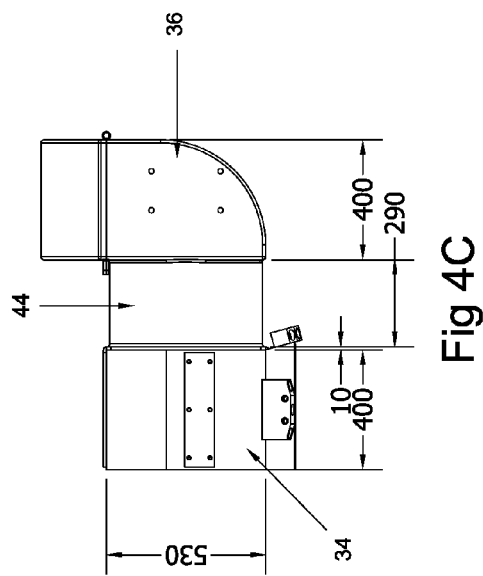

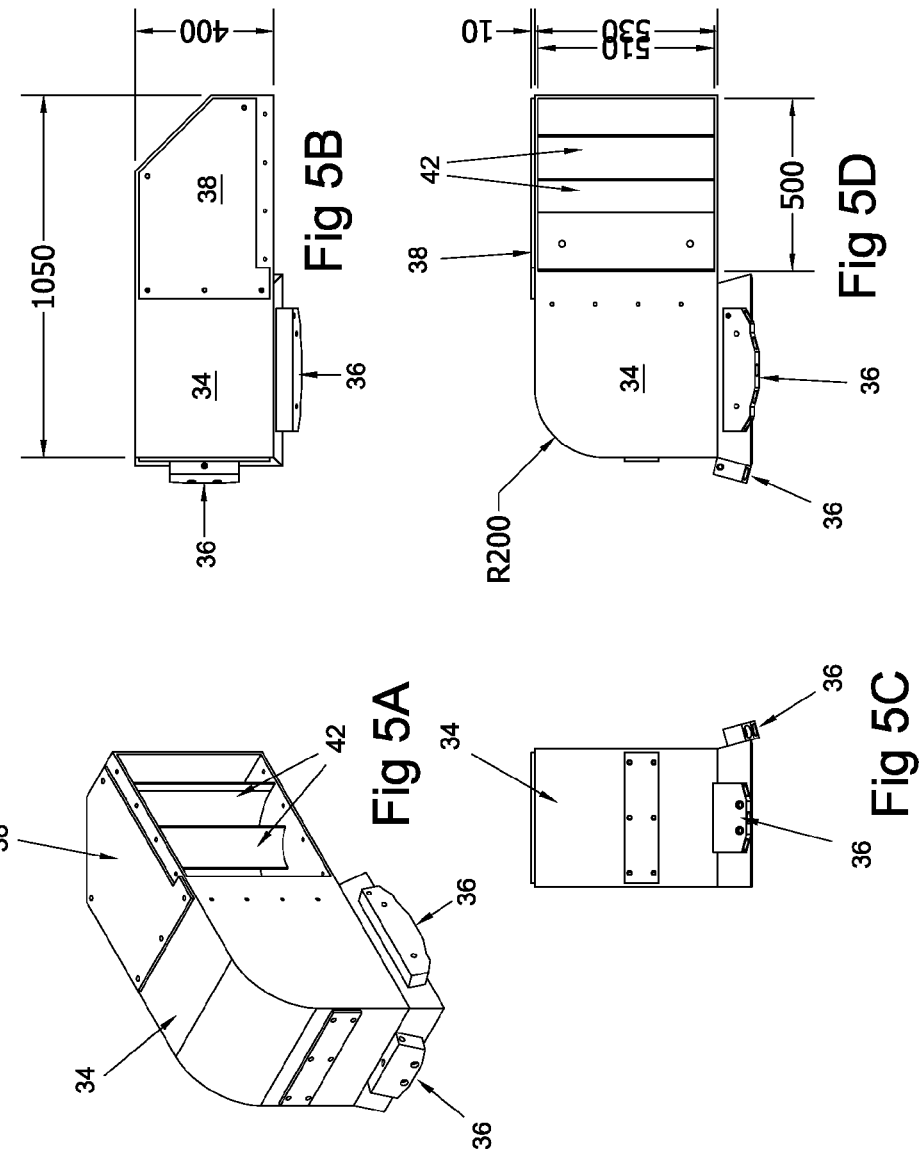

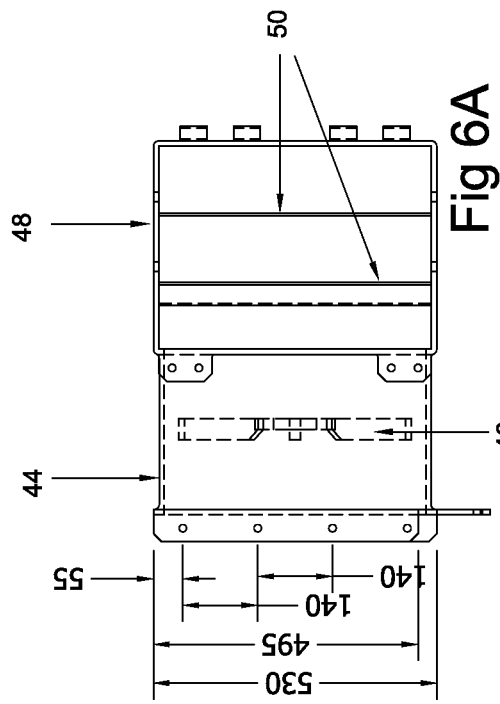
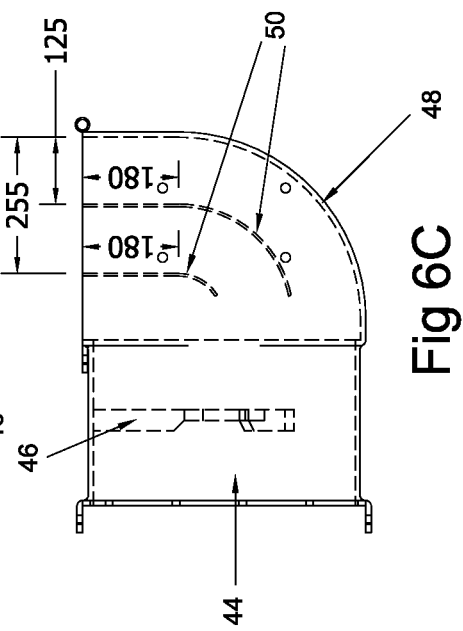
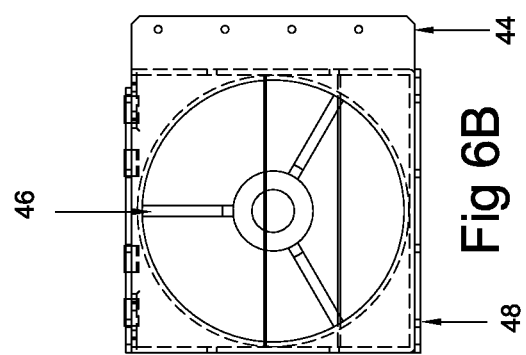

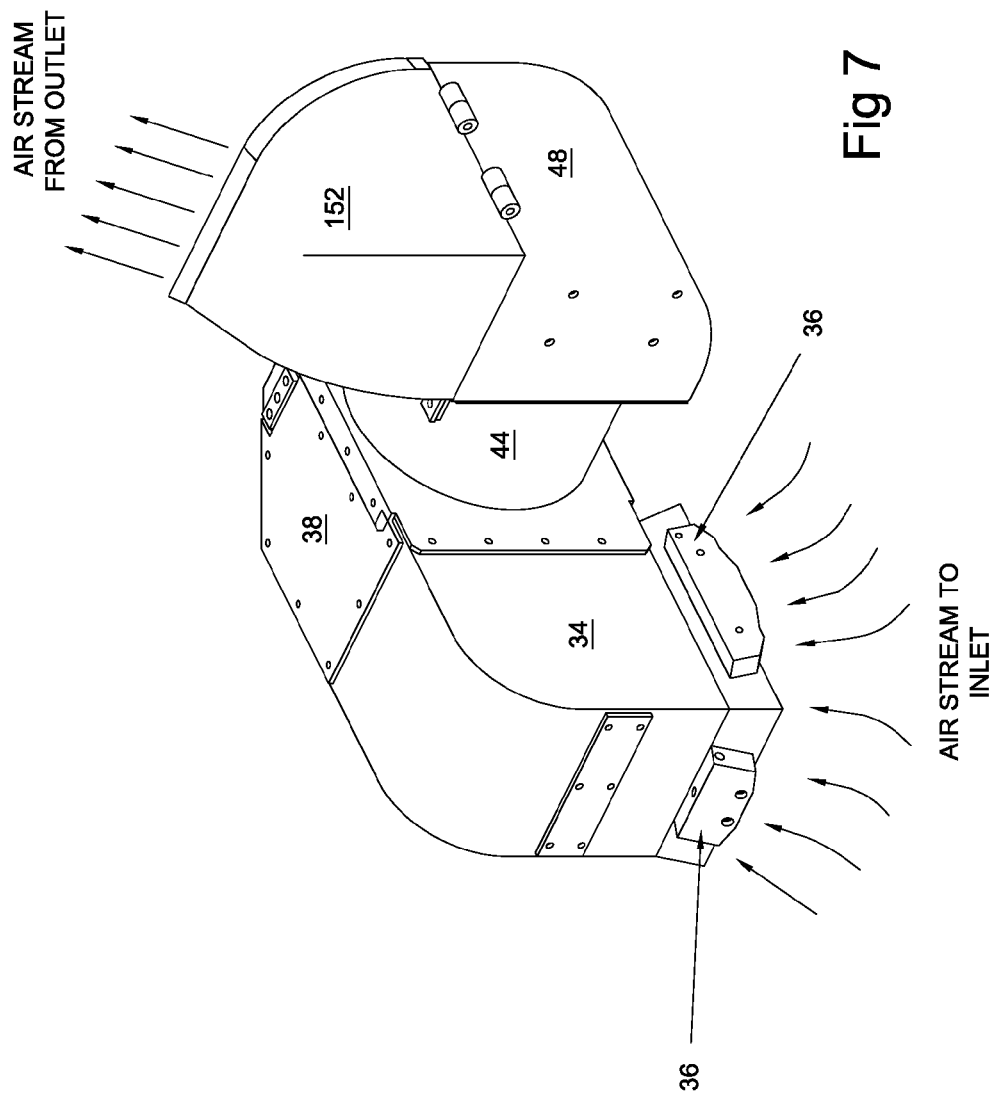

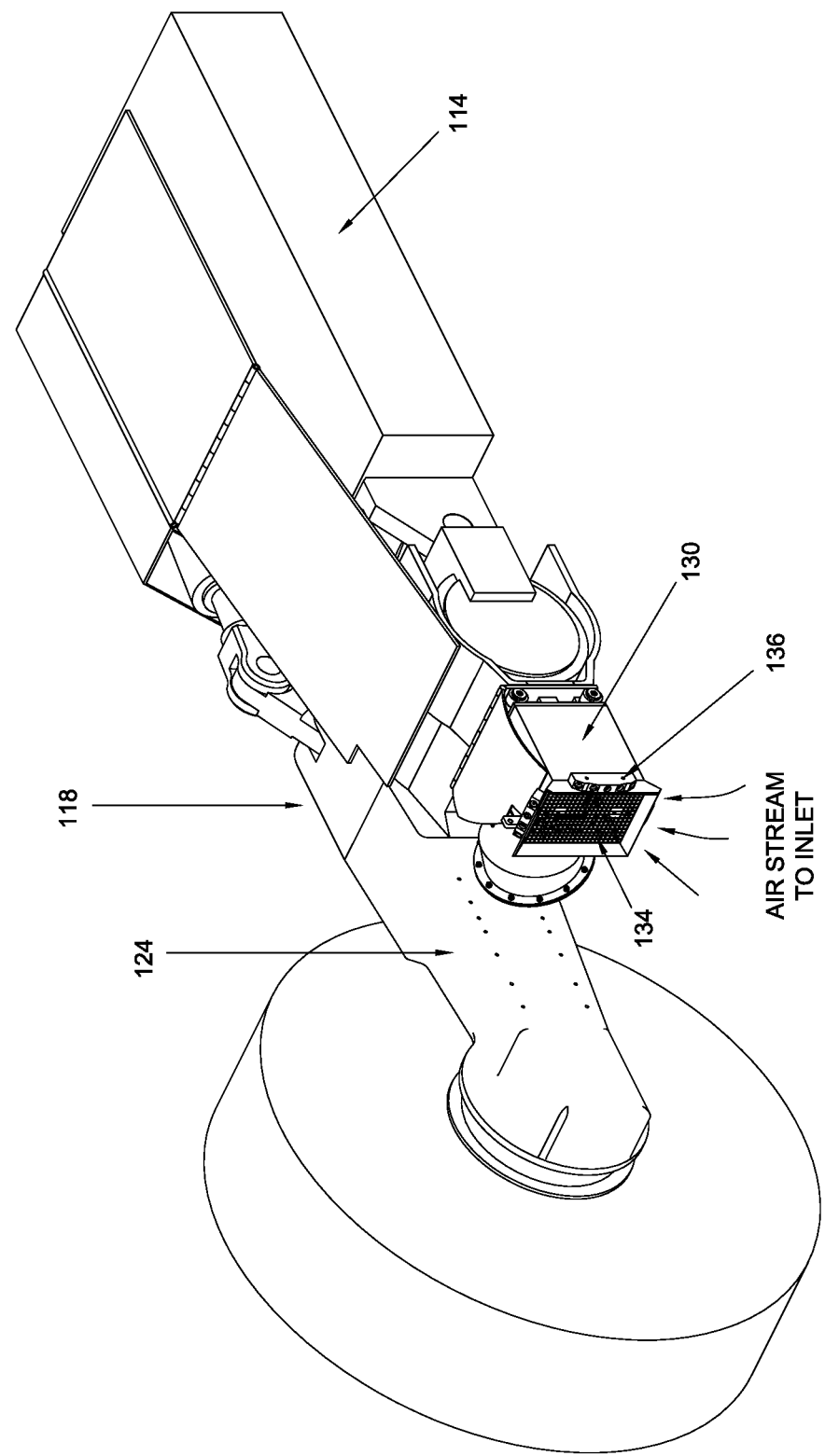

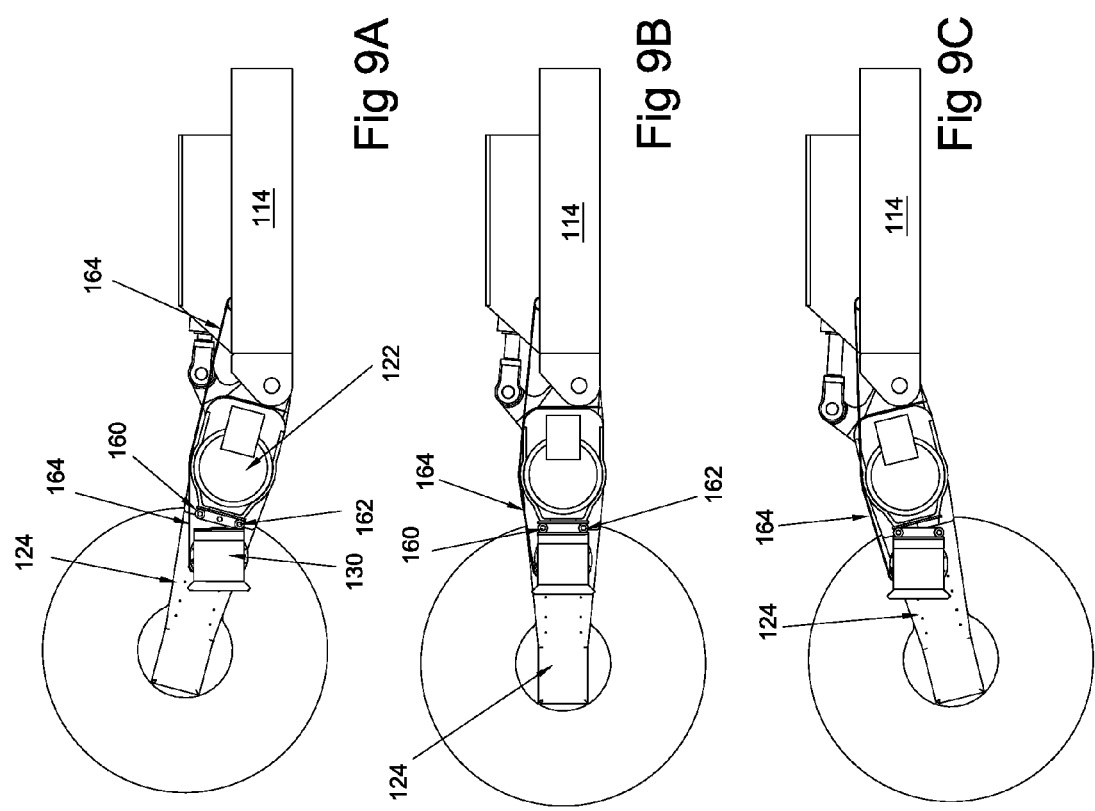

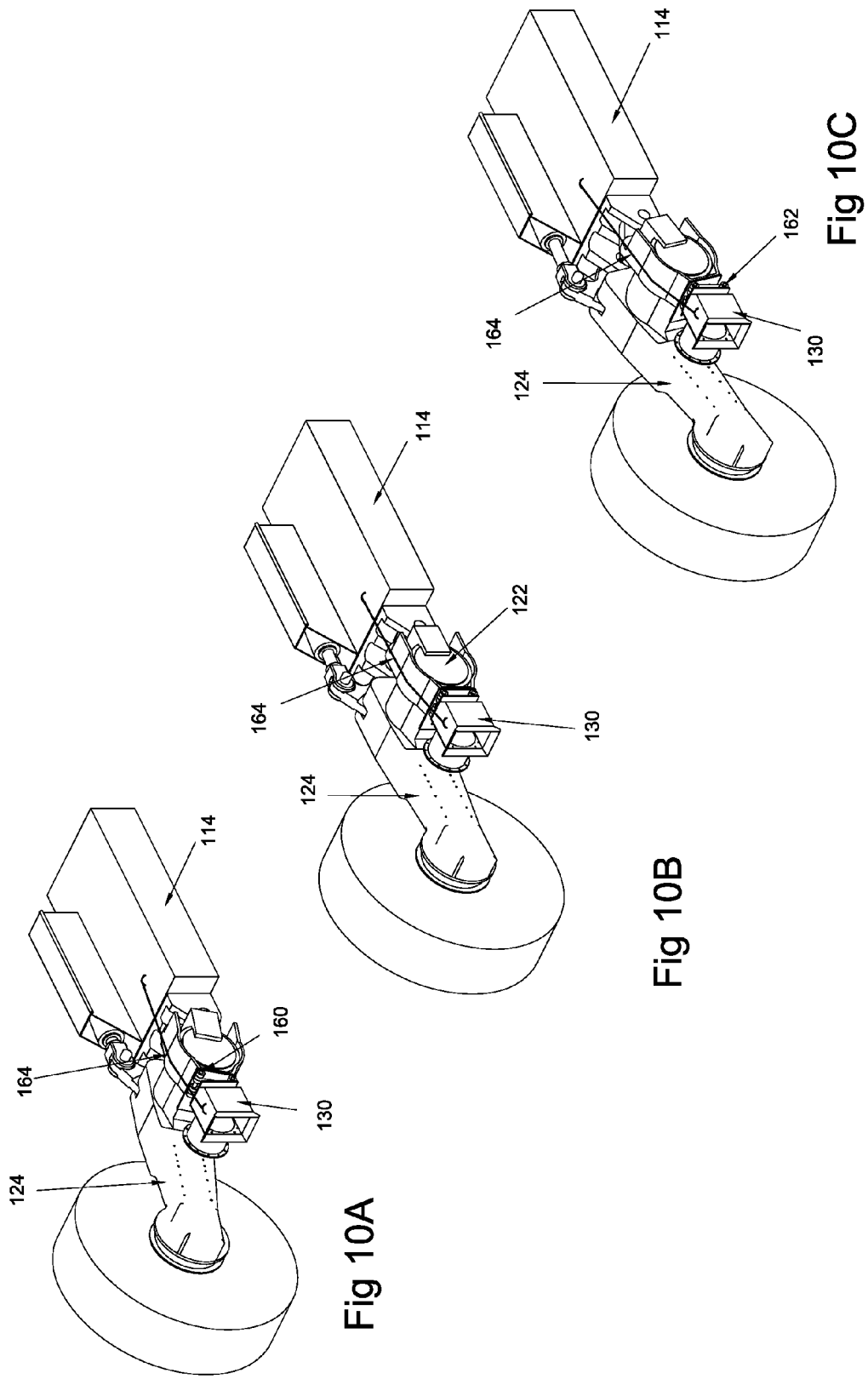

DUST SCRUBBER

This application is a divisional of U.S. Ser. No. 13/254,481, filed Nov. 30, 2011, now U.S. Pat. No. 8,551,233, which is a national stage entry of international application serial no. PCT/AU2010/000244, filed Mar. 3, 2010, which claims priority from Australian application serial no. 2009900913, filed Mar. 3, 2009, and Australian application serial no. 2009905581, filed Nov. 16, 2009, all of which are hereby incorporated by reference herein in their entireties.

BACKGROUND OF THE INVENTION

1. Field of the Invention

The present invention relates to dust removal for use in mining and other dusty workplace environments, and especially to dust suppression arrangements for use in conjunction with a mining shearer device to suppress dust generated.

2. Description of Related Art

Respirable dust is a health hazard to those working in the dusty environment, is a cause of respiratory complaints, and presents other dangers by limiting visibility by the workers. Because of this, workplace rules specify maximum permissible dust concentrations and/or exposures.

One activity which generates a considerable amount of dust in a confined space is mining, one form of which is the long wall mining technique often used for coal extraction.

Long wall mining involves the driving of a pair of parallel gate roads, referred to as the maingate and the tailgate, in the plane of the mineral ore seam, the gate roads being spaced apart by a distance referred to as the long wall. A mining machine, known as a shearer, then mines the coal face in the long wall by cutting the long wall in a direction transverse to the gate roads. The coal is extracted placed on an armoured conveyor and then conveyed to the maingate, fed into a crusher and then deposited on a rubber conveyor belt which carries the coal out of the mine. Support and drive means for the mining machine can be mounted in the gate roads.

The shearer machine has a shearer body which extends generally parallel to the long wall coal face, with a pivot joint at one end to a shearer arm supporting the shearer drum which performs the cutting. The drum is generally cylindrical and is driven to rotate about its axis, which is perpendicular to the face.

The position of the drum on the coal face is swept up and down by pivoting of the shearer arm relative to the shearer body, while horizontal movement across the long wall face is performed by movement of the shearer body.

Respirable dust may be produced by the cutting operation or as the long wall shearer machine moves forward or by associated operations in the mine. Ventilation is provided to maintain an air flow along the long wall to help reduce dust problems, but this is often insufficient on its own to meet appropriate standards and further measures are required.

U.S. Pat. No. 4,351,567 discloses a cowl-like dust scrubber fitted to the shearer drum at its trailing side to capture dust generated by the cutting operation, incorporated into or attached to the cowl which usually resides at that location.

SUMMARY OF THE INVENTION

The present invention seeks to provide an alternative dust suppression arrangement.

In one form, the invention provides a dust scrubber which is adapted to mount to the shearer arm, so as to be located at a side of the arm which faces away from the mine surface to be cut.

A first form of the invention provides a dust scrubber for suppressing dust generated by mining shearer of the type which includes a shearer arm having a front face proximal to a mine surface to be cut and a rotating shearer drum supported at the front face of the shearer arm, the dust scrubber including a housing having an inlet, an outlet and a passage between the inlet and the outlet, an extraction fan for drawing an air stream containing dust particles into the scrubber and through the housing passage, and particle extraction means for removing particles from the air stream, wherein the dust scrubber is adapted to be mounted to the shearer arm so as to remove airborne particles generated by operation of the shearer drum.

A further form of the invention provides a mining shearer and dust scrubber combination comprising a long wall mining shearer including a shearer arm having a front face proximal to a long wall mine surface to be cut and a rotating shearer drum supported at the front face of the shearer arm; and a dust scrubber as described herein.

In a further form, the invention provides a dust suppression arrangement for a mining shearer which comprises a movable shearer arm attached to a shearer body, the arrangement including a dust suppression unit mounted to the shearer by mounting means which at least partially compensates for movement of the shearer arm relative to the shearer body.

In one preferred form, the mounting arrangement includes a double hinge arrangement which acts to keep orientation of the dust suppression unit relatively steady upon pivoting of the shearer arm relative to the shearer body.

Further forms of the invention will be apparent from the description, and from the claims.

BRIEF DESCRIPTION OF THE DRAWINGS

Further preferred embodiments of the invention will now be described with reference to the accompanying drawings, in which:

FIG. 3 shows the scrubber of the first embodiment separated from the shearer arm;

FIGS. 4A to 4D are respectively isometric, plan, end and rear views of the scrubber of FIG. 3;

FIGS. 5A to 5D are respectively isometric, plan, end and rear views of the inlet and a filter/contact chamber housing portion of the scrubber;

FIGS. 6A to 6C are respectively plan, front and end views of the fan housing and outlet housing portion of the scrubber of FIG. 3;

FIG. 7 is an isometric view of a scrubber according to a second preferred embodiment, having a modified outlet diverter hood configuration;

FIG. 8 shows a dust scrubber and mounting arrangement according to a second embodiment of the invention;

FIGS. 9A to 9C is a series of rear views of a miner shearer arm and dust scrubber of FIG. 8, with the shearer arm pivoted between raised, neutral and lowered positions;

FIGS. 10A to 10C are isometric views of the arrangement of FIG. 9A to 9C, in similar positions.

Figure 1:
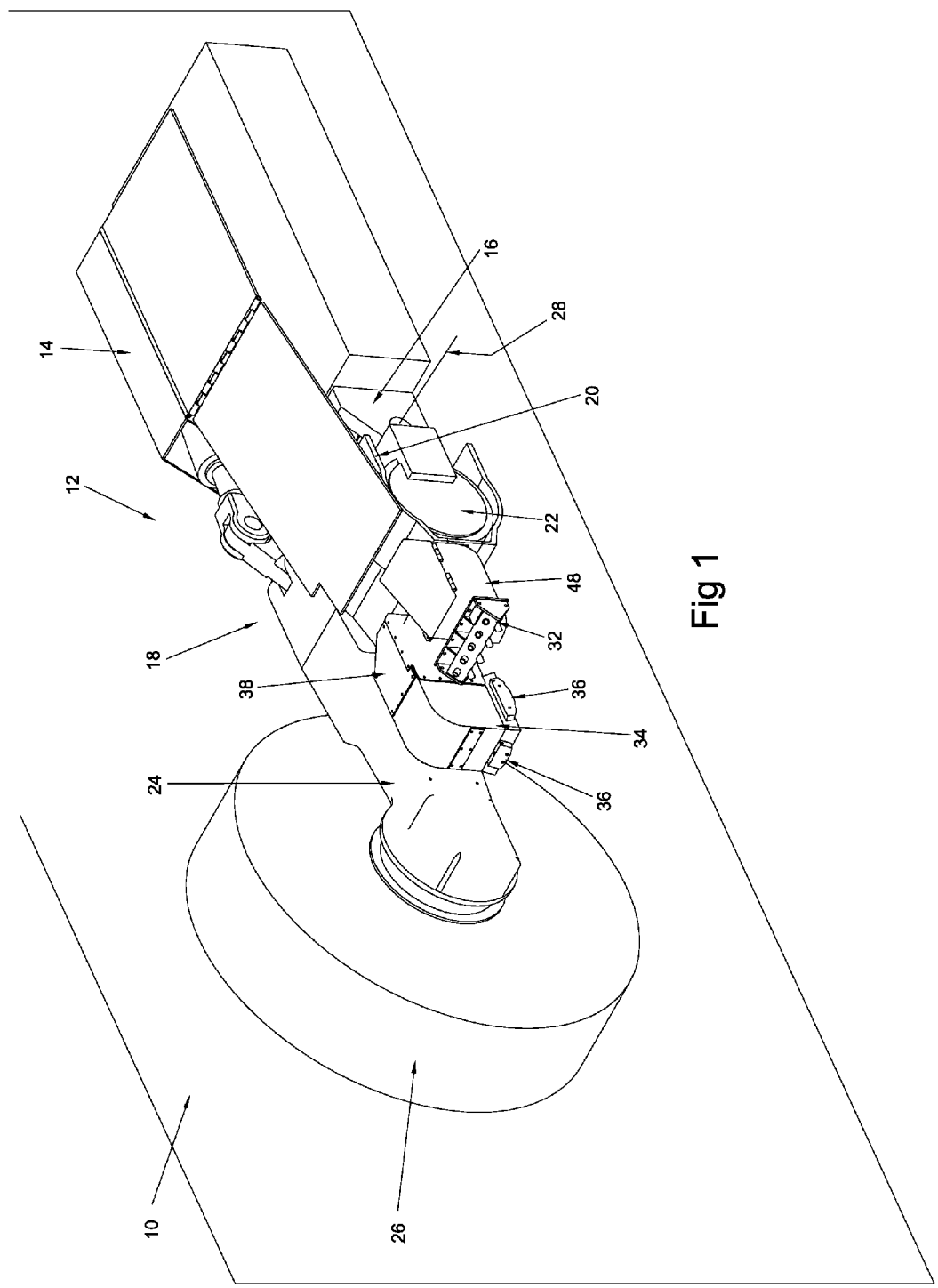
FIG. 1 shows a dust scrubber according to a first preferred embodiment, mounted to a long wall mine shearer.

Where shown, dimensions are in millimeters.

DETAILED DESCRIPTION OF PREFERRED EMBODIMENTS

The invention is described herein for use in long wall mining, in which the face 10 a mineral seam (usually coal) is mined by a shearer machine 12 having a shearer body 14 with a series of pivot cleats 16 at one end, and a shearer arm 18—usually L-shaped—with mating pivot cleats 20 on a pivot arm portion 22 of the shearer arm and a main arm portion 24 which extends parallel to the face of the seam.

The shearer arm main portion carries on its front face a generally cylindrical shearer drum 26, which has teeth (not shown) for cutting into the coal face as it is rotated. The drum is driven by a drive mechanism (not shown) inside the shearer arm to cut coal from the face, which is then collected and transported by conveyor to the surface.

The shearer drum is moved across the coal face in the horizontal direction by moving the shearer body, whilst the height of the drum on the coal face is varied by pivoting of the shearer arm about a pivot axis 28 through the cleats 16, 20.

Operation of the shearer generates a great deal of dust, which impedes visibility and is a health hazard to workers in the vicinity.

In order to help suppress this dust, a dust scrubber 30 is mounted to the shearer arm. In the first illustrated embodiment of FIGS. 1 and 2, the scrubber 30 is mounted at the rear of the main arm portion 24 of the shearer arm 18, i.e. on the opposite side of the arm from the shearer drum 26. In the first illustrated embodiment, the scrubber housing is mounted to both the main arm portion 24 and the pivot arm portion 20, fitting into the 90 degree internal corner between these parts.

The scrubber 30 may be mounted by any suitably convenient and robust means; bolting of the scrubber housing to the shearer arm is preferred.

Figure 2:
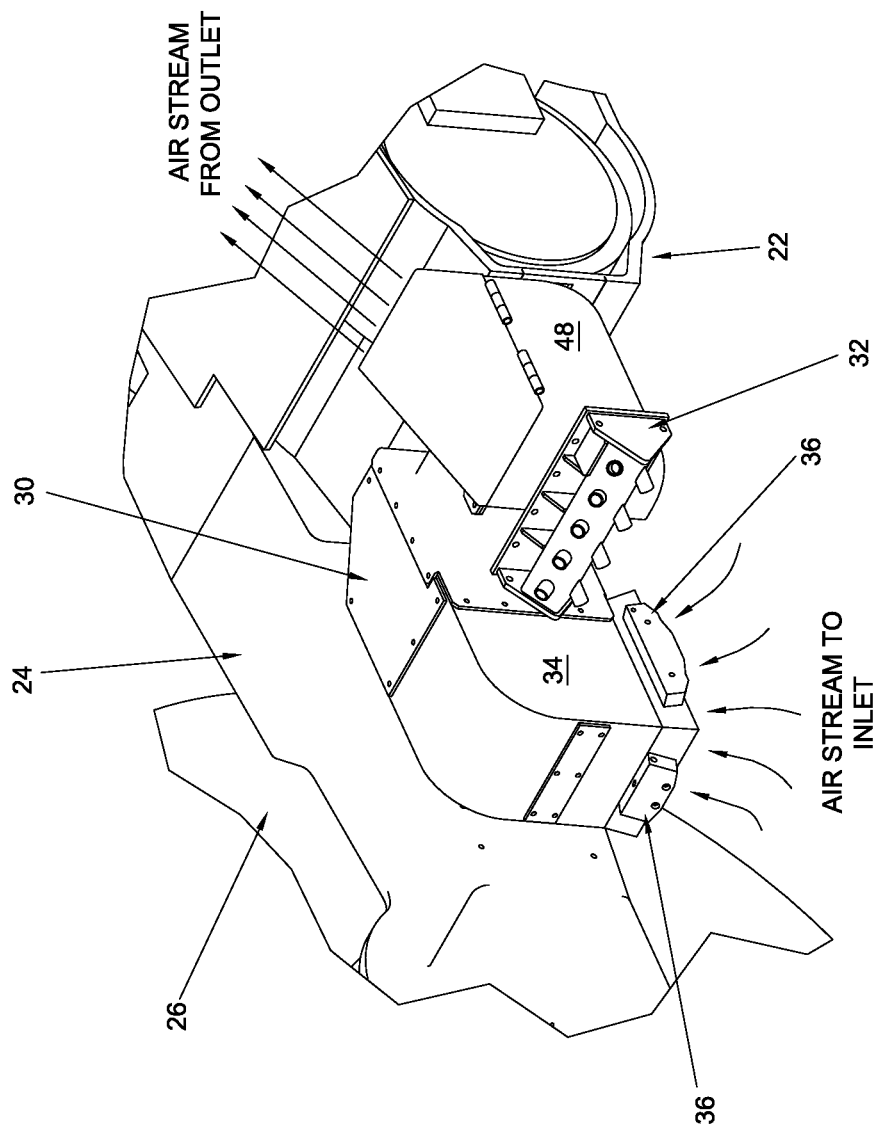
FIG. 2 is a more detailed view of the scrubber of FIG. 1 mounted to the shearer arm.

As can be seen in FIG. 1, the scrubber may be adapted for fitting of the water spray unit 32 which would normally be fitted to the shearer arm in this position.

With reference to FIGS. 2, 3 and 4A to 4D, the scrubber 30 housing has a generally rectangular section inlet 34 which opens to the bottom, with water spray nozzles 36 adjacent the inlet to spray a fog of water droplets out into the dust-laden air stream which is being drawn into the inlet to promote intimate contact between the dust particles in the air and the water spray.

The air stream passes upwards into the inlet, then the passage within the housing turns 90 degrees into a rectangular, horizontal filter/contact chamber portion 38 of the housing which runs parallel to the main arm portion 24 of the shearer arm 18, in the direction towards the shearer body.

The filter/contact chamber 38 may optionally include a rectangular filter plate 40 (shown in ghost in FIGS. 5B and 5D) across the air flow path. The filter plate 40 may of the type formed of one or more layers of a metal mesh contained within a frame, or any another suitable type. Preferably, the filter is of the wet type, with the housing also containing internal water spray nozzles (not shown) directed onto the surface of the filter plate to wash the filter.

Alternatively, the filter/contact chamber can be an open chamber in which the contact between the dust particles and water droplets in the air stream is continued.

FIGS. 5A to 5D show the housing inlet 34 and filter/contact chamber 38, including curved vanes 42 in the filter/contact chamber 38 to promote smooth air flow into the next 90 degree bend in the air passage, into the fan housing 44, described below.

The cylindrical fan housing portion 44 extends parallel to the pivot arm portion of the shearer arm, generally perpendicular to the coal face 10, and houses a fan 46 for drawing air into and through the scrubber housing. The fan 46 (shown in ghost in FIGS. 6A and 6C) is preferably capable of generating high flow volumes through the scrubber, for example from 1 to 10 m³/s, more preferably about 3-7 m³/s, most preferably about 5 m². Preferably, the fan is fluid-driven, for example hydraulically actuated.

The number and profile of the fan blades, and the speed at which the fan is driven, may be varied to achieve the desired pressure and flow characteristics, as known per se.

The air stream then passes into the outlet chamber 48, where it is guided by curved vanes 50 to pass vertically into an outlet lid 52, which is contoured to direct the outlet air flow with entrained dust/water mixture back over the top of the shearer body 14, away from the workers.

Air flow through the scrubber is preferably balanced by keeping the air passage cross sectional area approximately equal between the inlet, contact chamber and outlet sections, for example at approximately 0.1 m² to 0.3 m², for example about 0.2 m².

As seen from FIGS. 5A to 6C, the scrubber housing may be formed in a number of sections—for example the inlet and contact chamber portion (FIGS. 5A to 5D), the fan and outlet housing (FIGS. 6A to 6C) and the hinged outlet lid 52, assembled by bolting or other means which allows disassembly for servicing.

The scrubber housing may be formed of any suitably robust material, for example of welded and/or bolted steel sections, and may include mounting blocks for attachment of the housing to the shearer arm as previously described.

The housing may also include a connection block (not shown) for attachment of water supply for the scrubber and hydraulic fluid for driving the fan, FIG. 7 shows an alternative outlet lid 152 which is contoured to divert the outlet stream over the shearer body but with direction components in the upwards and forward (i.e. in the direction towards the coal face) directions, so as to reduce the spray of the dirty water exiting the device coming into contact with the workers.

FIGS. 8, 9A to 9C and 10A to 10C illustrate an alternative embodiment, in which a dust suppression unit—shown here as a dust scrubber 130—is mounted to the pivoting shearer arm in a manner which keeps the position and/or orientation of the dust suppression unit relatively stable despite raising and lowering of the shearer arm 118 relative to the shearer body 114.

The dust scrubber shown in FIGS. 8 to 10C is a modified version of that described and shown in respect of FIGS. 1 to 7.

Compared to the dust scrubber of FIGS. 1 to 7, the scrubber of FIGS. 8 to 10C is modified so that it draws in air at an inlet 134 at its end, and ejects the outlet air flow with entrained dust/water mixture forward underneath the main arm portion 124 of the shearer arm 118, i.e. back towards the coal face.

The operation of the dust scrubber is generally similar to that described above in relation to the first embodiment, including the inclusion of inlet spray nozzles 136, an internal fan and optional wet filter arrangement (not shown).

Also similar to the first embodiment, the scrubber is mounted to the shearer arm so as to be located behind the main arm portion 124, so that it draws dust-laden air from behind the rear face of the shearer main arm, on the opposite face to the shearer drum.

The mounting arrangement of the scrubber however varies from the first embodiment, in that it is mounted via a hinge arrangement to the shearer arm so as to maintain a relatively static position and/or orientation compared to the shearer body despite up and down movement of the shearer arm in use.

The illustrated mounting arrangement comprises a double hinge arrangement which has upper 160 and lower 162 hinges connecting three hinge plates in a generally Z arrangement, and a flexible link 164 such as a chain, cable or similar ligature extending between respective mounting lugs or other attachment means on the top of the scrubber casing and the shearer body. The link 164 may hinge over the cover of the pivot arm portion 122 of the shearer arm.

As can be seen in FIGS. 9A to 9C and 10A to 10C, when the shearer arm is generally horizontal (FIGS. 9B and 10B), the double hinge is closed so that the scrubber is also horizontal.

When the shearer arm is pivoted up (FIGS. 9A and 10A), it can be seen that the lower hinge falls open under gravity to the extent allowed by the chain, to keep the scrubber relatively horizontal. Likewise, when the shearer arm is pivoted down (FIGS. 9C and 10C), it can be seen that the chain pulls upper hinge to keep the scrubber relatively horizontal.

In this way, the orientation of the scrubber is kept relatively stable despite movement of the shearer arm, so that the dust extraction performance is less affected.

The mounting arrangement may also be used for mounting of other dust suppression equipment, for example sprays, to a shearer arm in a manner which provides compensation for movement of the shearer arm.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise, comprised and comprises where they appear.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

I claim:

1. A dust suppression arrangement for use with a mining shearer which includes a movable shearer arm attached to a shearer body, the dust suppression arrangement comprising:
a dust suppression unit and a mounting for mounting the dust suppression unit to the shearer arm, the mounting including a compensation mechanism that adjusts at least one of position and orientation of the dust suppression unit relative to the shearer arm responsive to movement of the shearer arm relative to the shearer body;
wherein the compensation mechanism includes a double hinge arrangement which acts to maintain orientation of the dust scrubber unit relative to the shearer body generally static irrespective of pivoting movement of the shearer arm relative to the shearer body, and a flexible link between the dust suppression unit and the shearer body so as to actuate the double hinge arrangement.

2. A dust suppression arrangement according to claim 1, wherein:
the flexible link is a fixed length link.

3. A dust suppression arrangement according to claim 1, wherein:
the flexible link is a chain.

4. A dust suppression arrangement according to claim 1, wherein:
the double hinge arrangement comprises three hinge plates in a generally Z-shaped arrangement and a pair of generally horizontal hinges.

5. A dust suppression arrangement according to claim 4, wherein:
the double hinge arrangement comprises a first hinge plate attached to the shearer arm, a second hinge plate attached to the dust scrubber unit, and an intermediate hinge plate connected to said first hinge plate via a generally horizontal first hinge and connected to said second hinge plate via a generally horizontal second hinge.

6. A dust suppression arrangement according to claim 5, wherein:
said flexible link causes said first hinge to open up when the shearer arm is pivoted below horizontal.

7. A dust suppression arrangement according to claim 6, wherein:
said flexible link allows said second hinge to open up to a limited extent when the shearer arm is pivoted above horizontal.

8. A dust suppression arrangement according to claim 1, wherein:
said dust suppression unit is a dust scrubber for removing airborne particles from a region behind the shearer arm.

9. A dust suppression arrangement according to claim 1, wherein:
the compensation mechanism acts to maintain at least one of position and orientation of the dust scrubber relative to the shearer body generally static.

10. A mining apparatus comprising:
a mining shearer which includes a movable shearer arm attached to a shearer body; and
a dust suppression arrangement according to claim 1.

11. A mining apparatus comprising:
a mining shearer which includes a movable shearer arm attached to a shearer body; and
a dust suppression unit and a mounting for mounting the dust suppression unit to the shearer arm, the mounting including a compensation mechanism that adjusts at least one of position and orientation of the dust suppression unit relative to the shearer arm responsive to movement of the shearer arm relative to the shearer body;
wherein the compensation mechanism includes a double hinge arrangement and a flexible link between the dust suppression unit and the shearer body so as to actuate the double hinge arrangement responsive to pivoting movement of the shearer arm relative to the shearer body.

12. A mining apparatus according to claim 11, wherein:
said dust suppression unit is a dust scrubber for removing airborne particles from a region behind the shearer arm.

* * * * *